Dec. 3, 1963     H. C. LUECHAUER     3,113,110
HYDRAULIC PRESSURE TRANSMISSION MEDIA
Filed July 27, 1960
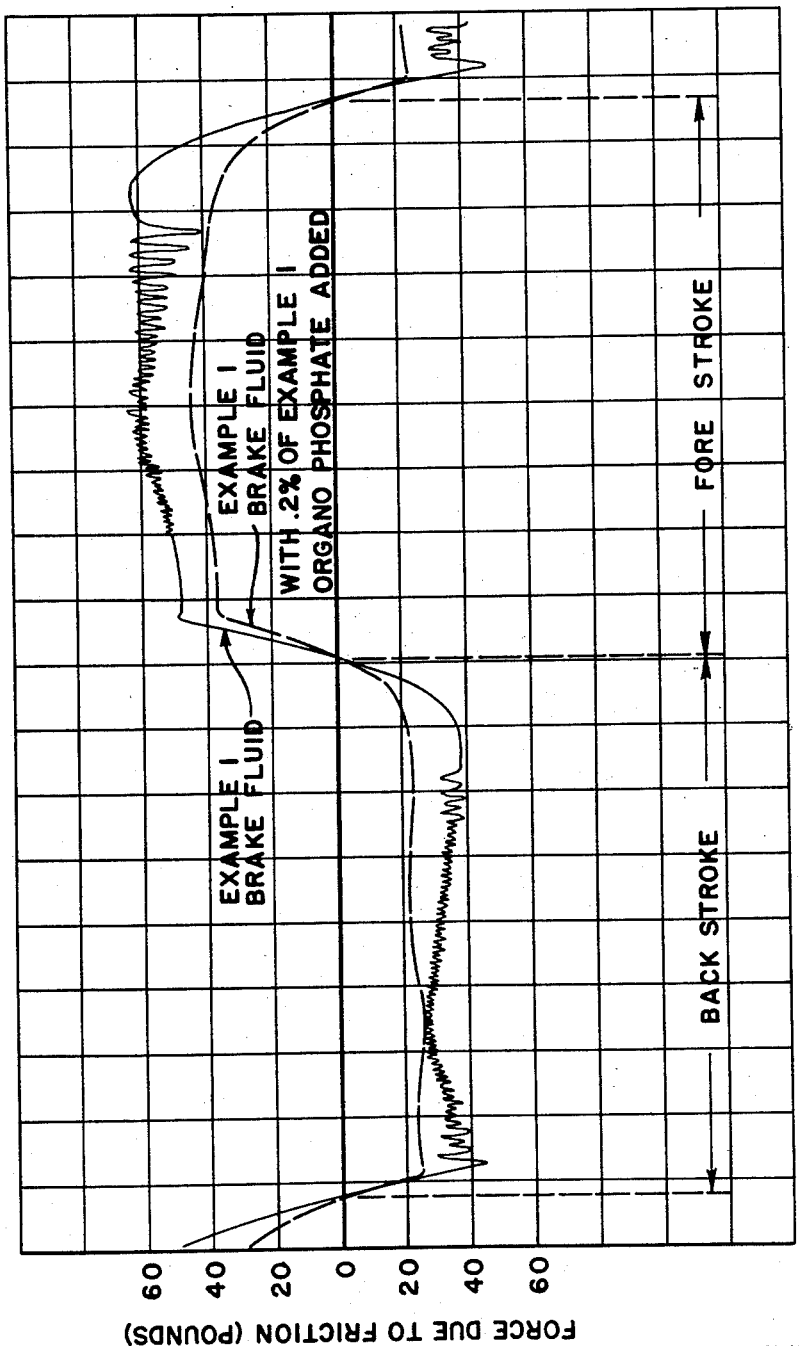
INVENTOR.
Holle C. Luechauer
BY
His Attorney 3,113,110
HYDRAULIC PRESSURE TRANSMISSION MEDIA
Holle C. Luechauer, Dayton, Ohio, assignor to General Motors Corporation, Detroit, Mich., a corporation of Delaware
Filed July 27, 1960, Ser. No. 45,565
2 Claims. (Cl. 252—78)

This invention relates to a hydraulic pressure transmission media and is particularly concerned with an operating fluid for use in fluid pressure operated devices wherein the fluid has a high degree of lubricity.

It is, therefore, the basic object of this invention to provide a hydraulic pressure transmission fluid for use in hydraulic systems which has a high degree of lubricity while maintaining desired viscosities within a predetermined range at extreme temperature conditions.

A further object of the invention is to provide a brake fluid for transmitting hydraulic pressures within vehicular brakes wherein an organo-phosphate is added to the fluid for improving lubricity thereof.

In carrying out the above object, it is a further object to utilize organo-phosphates as additives wherein the said phosphates are taken from the class consisting of: dilauryl phosphate and phosphoric acid esters of fluoroalcohols and are added to the fluid in quantities of from .01% to 2.0% by weight with .2% by weight being preferred.

Further objects and advantages of the present invention will be apparent from the drawing and from the following description wherein preferred embodiments of the present invention are clearly shown.

In the drawing:

FIG. 1 is a chart from an X—Y plotter showing the action of a brake piston in a brake cylinder wherein the force required to move the piston is plotted against the stroke thereof utilizing a commercial brake fluid as the hydraulic media and a similar chart for the same set up using the same brake fluid with .2% of an ester of a fluoroalcohol and phosphoric acid added.

Hydraulic pressure transmission media, such as hydraulic fluids, commonly called brake fluids in the art, are generally made up of three basic units. These comprise a base for the system which includes heavy bodied fluids such as polyglycols, castor oil, reacted castor oil and mixtures of the aforesaid materials, diluents for controlling the viscosity of the fluid generally taken from the class consisting of glycol ethers, glycols and alcohols and an inhibitor system wherein small quantities of inhibitors are added to deter oxidation, to improve wetting and flow and to maintain the pH of the system above 7. The inhibitor system used helps preserve the components of the brake system.

It is apparent from this survey of hydraulic brake fluids that the only material in the fluid which has a lubricating effect is in the base portion thereof wherein the reacted castor oil, glycol or castor oil as the case may be, has a degree of lubricity which aids in the maintenance of free action within the braking system. In this connection the brake cylinder which controls the fluid pressure applied to the wheel brakes includes a piston which utilizes a resilient cup as a sealing means which cup slides in sealing engagement with the cylinder walls. The cup is formed from rubber-like material, usually butadiene-styrene co-polymer rubber, commercially known as GRS. In many applications the lubricating effect of the base material of the brake fluid is insufficient to permit easy sliding of the cup over the cylinder walls resulting in a binding action which is represented by a chatter.

It has also been found that, in many instances, the lubricity of this system is not sufficient to prevent wear of the several parts of the system whereby replacement of certain moving parts is required periodically which wear is a direct result of the aforesaid chatter. It is not possible to add a conventional lubricant to the brake fluid without changing its characteristics since such an addition must be of appreciable volume in order to produce the desired effect. For this reason brake fluids have depended entirely on the basic constituents for lubrication which, as shown heretofore is insufficient to prevent chatter with its attendant drawbacks.

In order to eliminate some of these problems to increase the useful life of brake systems and to improve the operation thereof, I have found that additions, in small quantities of specific materials such as: organo-phosphates to a brake fluid will greatly enhance the lubricating qualities thereof whereby chatter within the brake system is eliminated and a longer useful life is obtained from the parts thereof. I have found that where .01% to 2% by weight of a specific organo phosphate is added to a brake fluid, the chatter normally present is completely eliminated and that the said addition will remain in solution under all conditions of test procedures which are greatly exaggerated over actual conditions of use.

Specifically, the addition may be made to any one of a number of brake fluids, for example, the following brake fluids are exemplary of fluids in use at the present time to which the specific organo-phosphate may be added.

Example 1: Percent
Polyglycol base _____ 30
Diethylene glycol ethyl ether (Carbitol) _____ 30
Diethylene glycol butyl ether (Carbitol) _____ 30
Propylene glycol _____ 9
Inhibitors _____ 1

Example 2: Percent
Polyglycol base _____ 20
Reacted castor oil and glycol base _____ 10
Diethylene glycol ethyl ether _____ 30
Diethylene glycol butyl ether _____ 30
Propylene glycol _____ 4.5
Ethylene glycol _____ 4.5
Inhibitors _____ 1

Example 3: Percent
Polyglycol base _____ 30
Ethylene glycol ethyl ether _____ 60
Hexylene glycol _____ 9
Inhibitors _____ 1

Example 4: Percent
Polyglycol base _____ 15.5
Hexyl and amyl alcohol (50–50) _____ 45
Hexylene glycol _____ 39
Inhibitors _____ .5

Example 5: Percent
Reacted castor oil and glycol base _____ 15
Hexyl and amyl alcohol (50–50) _____ 45
Propylene glycol _____ 40

Example 6: Percent
Castor oil _____ 30
Butyl alcohol _____ 70

In the above fluids, 1 and 2 may be what is termed high boiling point fluids which meet SAE70R3 and VVH910 specifications. Example 3 is a moderate boiling point fluid which meets SAE specification 70R1 while Examples 4, 5 and 6 are low boiling point fluids which meet SAE specification 70R2. In all of the above formulations, the polyglycol base or castor oil or reacted castor oil is in quantities of 15% or more and this is blended with a diluent in quantities ranging from 50% to 80% by weight made up of glycols and glycol ethers or alcohols.

The polyglycol base referred to above is a reaction mixture of a glycol, such as ethylene or propylene glycol and ethylene oxide. This ingredient is termed in the trade as a polyglycol. For example, ethylene glycol and ethylene oxide form polyethylene glycol having a structural formula of HO($C_2$HO)$_M$—$C_2H_4$OH wherein N indicates the number of ethylene oxide molecules reacted. The same reaction may be carried out with propylene glycol and propylene oxide or with ethylene oxide or combinations of oxides and glycols etc. to form more complex polyglycol bases. In the examples the polyglycol base used was a reacted mixture of one mole of ethylene glycol and one mole of ethylene oxide.

In most instances, the inhibitor such as an anti-oxidant surface active agent, or buffer, or all three are added in small quantities not in excess of 1%.

While the aforementioned formulations are exemplary of a wide range of brake fluids, it is to be understood that other fluids coming within the broad classification can be improved in lubricity by the addition of the organo phosphate. For example, fluids using polyglycols, reacted castor oil and glycols, castor oil, reacted vegetable oils and castor oil, such as soy bean and corn oil, mixtures of polyglycols and castor oil may all be used as the base wherein the quantities range from 15% to 30%. The diluents may be monoalkyl glycol ethers and dialkyl glycol ethers which are reaction products of alkyl oxides and alcohols such as methyl, propyl, butyl or hexyl alcohols. Glycols such as ethylene, propylene and hexylene glycols may be used since they are of lower cost than the glycol ethers. However, they generally increase the viscosity of the fluid and, therefore, must be used in accordance with the results desired. In place of glycol ethers or glycols, the diluent may be an alcohol such as ethyl, butyl, amyl, hexyl or isopropyl alcohol, etc. However, in this instance amyl and hexyl alcohol tend to swell rubber and, therefore, the quantity of such an alcohol used should be maintained relatively low in the order of not in excess of 20%.

In all instances, however, the slipstick or chatter of a brake system utilizing any of the above conventional brake fluids may be greatly improved by the addition of the organo phosphate which definitely improves lubricity in each instance. It has been found that while quantities of from .01% to 2% are useful that a preferred figure is about .2% which will greatly improve the lubricity.

Specifically, the organo phosphates that are useful are dilauryl phosphates and esters of fluoroalcohols and phosphoric acid. These esters are the free phosphoric acid esters of fluoroalcohols having a general formula of

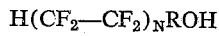

wherein N is a positive integer from 1 to 5 and R is of open chain aliphatic hydrocarbon radical containing from 1 to 6 carbon atoms and ROH is a saturated open chain aliphatic radical of a monohydric non-tertiary alcohol. Fluoroalcohols of this nature are fully disclsed in Joyce Patent 2,559,628.

Specifically, I have found the phosphoric acid esters of the following alcohols alone or in combination to be particularly desirable:

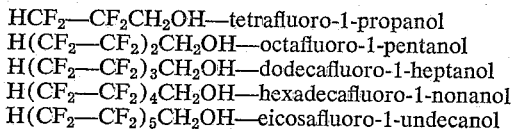

EXAMPLE 1

One highly useful combination comprises essentially a 50–50 mixture by weight of dodecafluoro-1-heptanol and eicosafluoro-1-undecanol wherein the mixture makes up substantially all of the fluoroalcohol ingredient used in the ester.

EXAMPLE 2

Another combination utilizing the same base, namely equal quantities of dodecafluoro-1-heptanol and eicosa-fluoro-1-undecanol comprehends a total of these two materials in mixture making up at least 60% by weight with one or more of the three remaining fluoroalcohols listed above making up the remainder wherein the fluoroalcohol ingredient is esterified with phosphoric acid.

EXAMPLE 3

Another addition is directed to the esterification product of dodecafluoro-1-heptanol and phosphoric acid wherein the dodecafluoro-1-heptanol makes up at least 90% by weight of the fluoroalcohol ingredient and wherein the remainder is any one or combination of the other four fluoroalcohols noted above.

EXAMPLE 4

In this instance the addition is directed to the esterification product of eicosafluoro-1-undecanol and phosphoric acid wherein the eicosafluoro-1-undecanol makes up at least 90% by weight of the fluoroalcohol ingredient and wherein the remainder is any one or combination of the other four fluoroalcohols noted above.

EXAMPLE 5

In this instance the addition agent comprises dilauryl phosphate which makes up substantially 100% of the addition.

The charts as shown in the drawings were obtained directly from a standard X—Y plotter and indicate graphically the great improvement in action of the brake when using .2% by weight of the mixture of fluoroalcohol esters of phosphoric acid noted in Example 1 in colunm 3 in the fluid. In this instance all conditions were the same for both curves and the fluid used was that disclosed in Example 1 in column 3. The slipstick noted by the plotter indicates chatter which results in wear and erratic brake action. Both fore and back strokes of the piston are shown. It will also be noted that when using a very small quantity of the organo-phosphate addition that the frictional characteristics of the brake are changed or lowered requiring less force on both the fore and back strokes to move the piston a given distance. Comparable results are obtained with any of the specific organo phosphates set forth when added within the range noted with best results being obtained with about .2% by weight addition.

While the embodiments of the present invention as herein disclosed constitute preferred forms it is to be understood that other forms might be adopted.

What is claimed is as follows:

1. A hydraulic pressure transmission media comprising, a base material in quantities of from 15% to 30% by weight taken from the class consisting of polyglycols, castor oil and mixtures thereof, a diluent in quantities of from 50% to 80% by weight and taken from the class consisting of glycol ethers, glycols, monohydric alcohols and mixtures thereof, and a lubricity enhancing agent consisting of fluoroalcohol esters of phosphoric acid wherein the fluoroalcohol has the general formula of H($CF_2$—$CF_2$)$_N$ROH wherein N is a positive integer from 1 to 5 and R is an open chain aliphatic hydrocarbon radical containing 1 to 6 carbon atoms and ROH is a saturated open chain aliphatic radical of a monohydric nontertiary alcohol, said lubricity enhancing agent being present in the hydraulic media in quantities ranging from .01% to 2%.

2. A hydraulic pressure transmission media comprising, a base material in quantities of from 15% to 30% by weight taken from the class consisting of polyglycols, castor oil and mixtures thereof, a diluent in quantities of from 50% to 80% by weight and taken from the class consisting of glycol ethers, glycols, monohydric alcohols and mixtures thereof, and a lubricity enhancing agent consisting of fluoroalcohol esters of phosphoric acid wherein the fluoroalcohol has the general formula of H($CF_2$—$CF_2$)$_N$ROH wherein N is a positive integer from 1 to 5 and R is an open chain aliphatic hydrocarbon radical containing 1 to 6 carbon atoms and ROH is a saturated open chain aliphatic radical of a monohydric nontertiary alcohol, said lubricity enhancing agent being present in the hydraulic media in quantities of .2%.

References Cited in the file of this patent

UNITED STATES PATENTS

| | | |
|---|---|---|
| 2,005,619 | Graves | June 18, 1935 |
| 2,080,299 | Benning et al. | May 11, 1937 |
| 2,223,793 | Peery | Dec. 3, 1940 |
| 2,285,855 | Downing et al. | June 9, 1942 |
| 2,291,066 | Waugh | July 28, 1942 |
| 2,337,650 | Dolian | Dec. 28, 1943 |
| 2,340,331 | Knutson et al. | Feb. 1, 1944 |
| 2,499,551 | White | Mar. 7, 1950 |
| 2,559,749 | Benning | July 10, 1951 |
| 2,727,058 | Conly | Dec. 13, 1955 |
| 2,754,317 | Conly | July 10, 1956 |
| 2,754,318 | Conly | July 10, 1956 |
| 2,825,695 | Mahoney et al. | Mar. 4, 1958 |